United States Patent
Hayakawa et al.

(10) Patent No.: US 8,459,428 B2
(45) Date of Patent: Jun. 11, 2013

(54) ELECTRONIC CLUTCH CONTROL APPARATUS FOR VEHICLE

(75) Inventors: Koshi Hayakawa, Saitama (JP);
Yoshitsugu Gokan, Saitama (JP);
Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 581 days.

(21) Appl. No.: 12/712,443

(22) Filed: Feb. 25, 2010

(65) Prior Publication Data

US 2010/0234178 A1  Sep. 16, 2010

(30) Foreign Application Priority Data

Mar. 16, 2009  (JP) .................. 2009-063365

(51) Int. Cl.
*F16D 48/06*  (2006.01)
(52) U.S. Cl.
USPC ............ 192/85.55; 192/84.6; 192/30 W
(58) Field of Classification Search
USPC ................................................. 192/85.5
See application file for complete search history.

(56) References Cited

U.S. PATENT DOCUMENTS

| | | | | |
|---|---|---|---|---|
| 5,729,979 A * | 3/1998 | Shaw et al. | ...... | 60/533 |
| 7,204,088 B2 * | 4/2007 | Uchiyama et al. | ...... | 60/594 |
| 7,656,385 B2 * | 2/2010 | Arche et al. | ...... | 345/156 |
| 8,011,489 B2 * | 9/2011 | Takeuchi | ...... | 192/85.5 |
| 2005/0001476 A1 * | 1/2005 | Kusano | ...... | 303/113.4 |
| 2009/0057090 A1 * | 3/2009 | Hayakawa et al. | ...... | 192/83 |

FOREIGN PATENT DOCUMENTS

| | | |
|---|---|---|
| JP | 2000-225927 A | 8/2000 |
| JP | 2003-239772 | 8/2003 |
| JP | 2008-275084 | 11/2008 |

* cited by examiner

*Primary Examiner* — David D Le
*Assistant Examiner* — Jacob S Scott
(74) *Attorney, Agent, or Firm* — Carrier Blackman & Associates, P.C.; Joseph P. Carrier; William D. Blackman (57) ABSTRACT

An electronic clutch control apparatus is provided for a vehicle having a clutch assembly and a clutch lever operatively associated with the clutch assembly. The electronic clutch control apparatus includes an actuator for driving a clutch assembly, an operation amount sensor for sensing an operation amount of a clutch lever, an electronic control unit for controlling the operation of the actuator based on the detected operation amount received from the operation amount sensor, and a feedback unit for applying an operation reaction force to the clutch lever. The feedback unit includes a plurality of springs having different spring constants. The feedback unit is configured such that when the clutch lever is operated in an operation amount increasing direction thereof, the operational reactive elastic forces of the plural springs are sequentially applied to the clutch lever.

20 Claims, 5 Drawing Sheets

ELECTRONIC CLUTCH CONTROL APPARATUS FOR VEHICLE

CROSS-REFERENCE TO RELATED APPLICATIONS

The present invention claims priority under 35 USC 119 based on Japanese patent application No. 2009-063365, filed on Mar. 16, 2009. The entire subject matter of this priority document, including specification claims and drawings thereof, is incorporated by reference herein.

BACKGROUND OF THE INVENTION

1. Field of the Invention

The present invention relates to an electronic clutch control apparatus for a vehicle. More particularly, the present invention related to an electronic clutch control apparatus including an actuator for driving a clutch assembly, an operation amount sensor for sensing an operation amount of a clutch lever, an electronic control unit for controlling operation of the actuator based on a detected operation amount of the clutch lever, and a feedback unit for applying an operation reaction force to the clutch lever.

2. Description of the Background Art

There is a known system for assisting a clutch operating force, for example, the system disclosed in the Japanese Patent Laid-open No. 2008-275084, wherein a driving force of an actuator can be transmitted to an operation force transmitting member, capable of transmitting an operating force, which has been applied to a clutch lever, to a clutch assembly.

Also known from the other Japanese Patent Laid-open No. 2003-239772 is an electronic throttle valve control device, in which an operation amount of a throttle lever is detected by a throttle lever position sensor, and the operation of an actuator for driving a throttle valve is controlled according to the operation amount detected by the throttle lever position sensor.

By applying the system disclosed in the Japanese Patent Laid-open No. 2003-239772 for operating the clutch assembly for controlling the operation of the actuator for driving the clutch assembly according the operation amount of the clutch lever, it is not necessary to route a hydraulic system and wires provided between the clutch lever and the clutch assembly.

Accordingly, the number of parts can be reduced and the flexibility of vehicle body layout can be improved. Furthermore, the operating force applied to the clutch lever can be reduced and the assisting device disclosed in the Japanese Patent Laid-open No. 2008-275084 can therefore be eliminated.

For controlling operation of the actuator for driving the clutch assembly according to the operation amount of the clutch lever, a feedback unit for applying an operation reaction force to the clutch lever is required. In the prior art apparatus, when an operation force applied to the clutch lever is transmitted to the clutch assembly by oil pressure or wire, there occurs play in a hydraulic system, due to the deformation of a hose or the like, or play in a wire system due to the extension of a wire or the like until a reaction force of a clutch spring is produced after starting the operation of the clutch lever.

The relation between the operation amount of the clutch lever and the operation load on the clutch lever changes among an initial stage where the above-mentioned play is occurring, the next stage where the clutch assembly is engaged or disengaged against the elastic force of the clutch spring, and the subsequent stage after engagement or disengagement of the clutch assembly.

If a feedback unit is simply configured such that the reaction force is proportionally increased with an increase in force applied to the clutch lever, an operator in the vehicle is given an operation feel different from feel experienced by operating the conventional clutch actuation systems.

It is accordingly one of the objects of the present invention to provide an electronic clutch control apparatus having an actuator for driving a clutch assembly which can make the operation feel of a clutch lever similar to an operation feel experienced during operation of a conventional clutch lever.

SUMMARY OF THE INVENTION

In order to achieve the above objects, the present invention according to a first aspect thereof provides an electronic clutch control apparatus for a vehicle having a clutch assembly and a clutch lever operatively associated with the clutch assembly. The electronic clutch control apparatus according to the first aspect hereof includes an actuator for driving the clutch assembly, an operation amount sensor for sensing an operation amount of the clutch lever, and an electronic control unit for controlling the operation of the actuator according to a detected operation of the clutch lever sensed by the operation amount sensor. The electronic clutch control apparatus according to the first aspect hereof also includes a feedback unit for applying an operation reaction force to the clutch lever. The feedback unit includes a plurality of springs, each having a different spring constant. When the clutch lever is operated in a direction such that the operation amount thereof is increased, the elastic forces of the springs are sequentially applied to the clutch lever as an operation reaction force.

The present invention according to a second aspect thereof, in addition to the first aspect, is characterized in that the plurality of springs of the feedback unit include first and second springs, connected in series. The spring constant of the second spring is less than the spring constant of the first spring, and the set load on the second spring is greater than the set load on the first spring. When the operation amount of the clutch lever is less than or equal to a predetermined value, the elastic force of the first spring is applied to the clutch lever. However, when the operation amount of the clutch lever is greater than the predetermined value, the combined elastic forces of the first and second springs are both applied to the clutch lever.

The present invention according to a third aspect thereof, in addition to the first and second aspects, is characterized in that the feedback unit further includes a fixed cylindrical body, a first piston operatively connected to the clutch lever and slidably fitted in the cylindrical body, and a second piston slidably fitted in the cylindrical body such that the first spring is interposed between the first piston and the second piston, and the second spring is interposed between the second piston and the cylindrical body.

The present invention according to a fourth aspect thereof, in addition to the third aspect, is characterized in that the first piston is coaxially and integrally formed with a shaft portion; and the second piston is coaxially and integrally formed with a cylindrical portion having a guide hole formed therein for slidably receiving and engaging the shaft portion of the first piston. The second spring comprises a compression coil spring; and the cylindrical portion is inserted in one end portion of the second spring.

The present invention according to a fifth aspect thereof, in addition to one of the third or fourth aspects, is characterized in that the first spring comprises a compression coil spring, and the second piston is formed with a holding recess therein for receiving one end portion of the first spring such that the other end of the first spring abuts against the first piston.

An electric motor shown in an illustrative embodiment corresponds to the actuator of the present invention, and a lever angle sensor shown in the illustrative embodiment corresponds to the operation amount sensor of the present invention.

EFFECTS OF THE INVENTION

According to the first aspect of the present invention, the feedback unit for applying a reaction force to the clutch lever has a plurality of springs having different spring constants, wherein when the clutch lever is operated in an operation amount increasing direction thereof, the elastic forces of the plural springs are sequentially applied to the clutch lever. Thus, the characteristics of a reaction force acting on the clutch lever are provided by the combination of the reaction characteristics of the plural springs.

Accordingly, it is possible to provide an operator of a vehicle an operation force similar to that obtained by the prior art devices, e.g., an operation force applied to the clutch lever transmitted to the clutch assembly by oil pressure or wire.

According to the second aspect of the present invention, the feedback unit includes the first and second springs connected in series, wherein when the operation amount of the clutch lever is less than or equal to a predetermined value, the elastic force of the first spring is applied to the clutch lever, and whereas when the operation amount of the clutch lever is greater than the predetermined value, the elastic forces of the first and second springs are applied to the clutch lever. A spring constant of the second spring is less than a spring constant of the first spring. A set load of the second spring is greater than a set load of the first spring.

Accordingly, it is possible to realize a change in the relation between the operation amount of the clutch lever, and the operation load on the clutch lever between in a first stage before engaging or disengaging the clutch assembly against the elastic force of a clutch spring and in a second stage after the first stage.

According to the third aspect of the present invention, the first spring is interposed between the first piston and the second piston, and the second spring is interposed between the second piston and the fixed cylindrical body, wherein the first piston is slidably fitted in the cylindrical body, and is operatively connected to the clutch lever, and the second piston is slidably fitted in the cylindrical body.

Accordingly, the feedback unit can be configured by using a part of the master cylinder used in the conventional apparatus such that an operation force applied to the clutch lever is hydraulically transmitted to the clutch lever. As a result, a cost reduction can be expected as compared with the case that dedicated parts are originally prepared.

According to the fourth aspect of the present invention, the first piston is coaxially and integrally formed with the shaft portion, and the second piston is coaxially and integrally formed with the cylindrical portion having the guide hole for slidably receiving and engaging the shaft portion of the first piston. Further, the cylindrical portion of the second piston is inserted in one end portion of the second spring.

Accordingly, smoothing of the sliding operation of the first piston in the cylindrical body and positioning of one end portion of the second spring can be realized with a simple structure using no specific, dedicated components.

According to the fifth aspect of the present invention, the second piston is formed with the holding recess for receiving one end portion of the first spring therein such that the other end of the first spring abuts against the first piston. Accordingly, positioning of one end portion of the first spring can be realized with a simple structure using no specific, dedicated components.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment for carrying the present invention is now described with reference to the attached drawings FIGS. 1 to 5.

Figure 1:
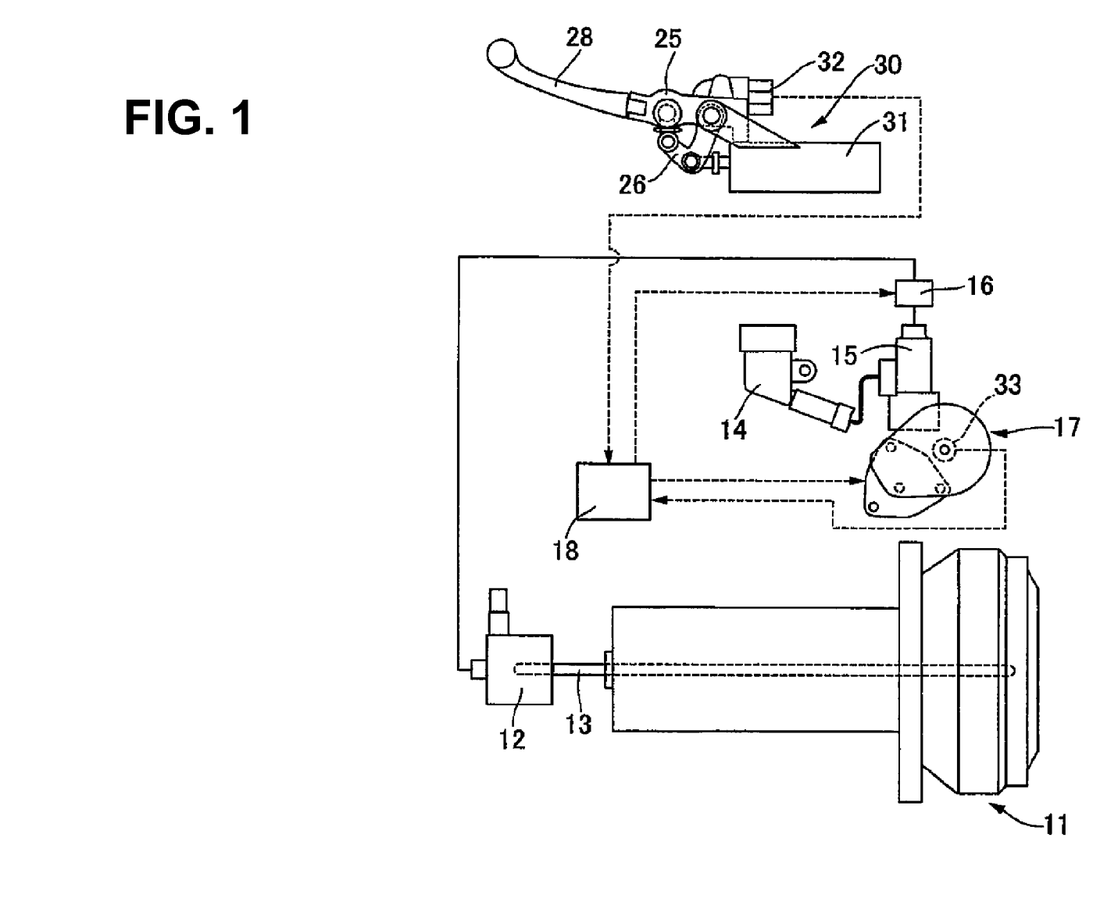
FIG. 1 is a schematic diagram showing configuration of an electronic clutch control apparatus according to the present invention.

As shown in FIG. 1, a clutch assembly 11 is provided between an engine (not shown) and a transmission unit (not shown) of a vehicle such as, for example, a motorcycle or all-terrain vehicle. The clutch assembly 11 is operated according to the axial movement of a rod 13 axially driven by a slave cylinder 12, for selectively switching between the application or disconnection of power between the engine and the transmission.

A master cylinder 15 is connected through an electromagnetic on-off valve 16 to the slave cylinder 12. A reservoir 14 is connected to the master cylinder 15. The master cylinder 15 is driven by a driving force exerted by an actuator 17. The actuator 17 is an electric motor 17.

Figure 2:
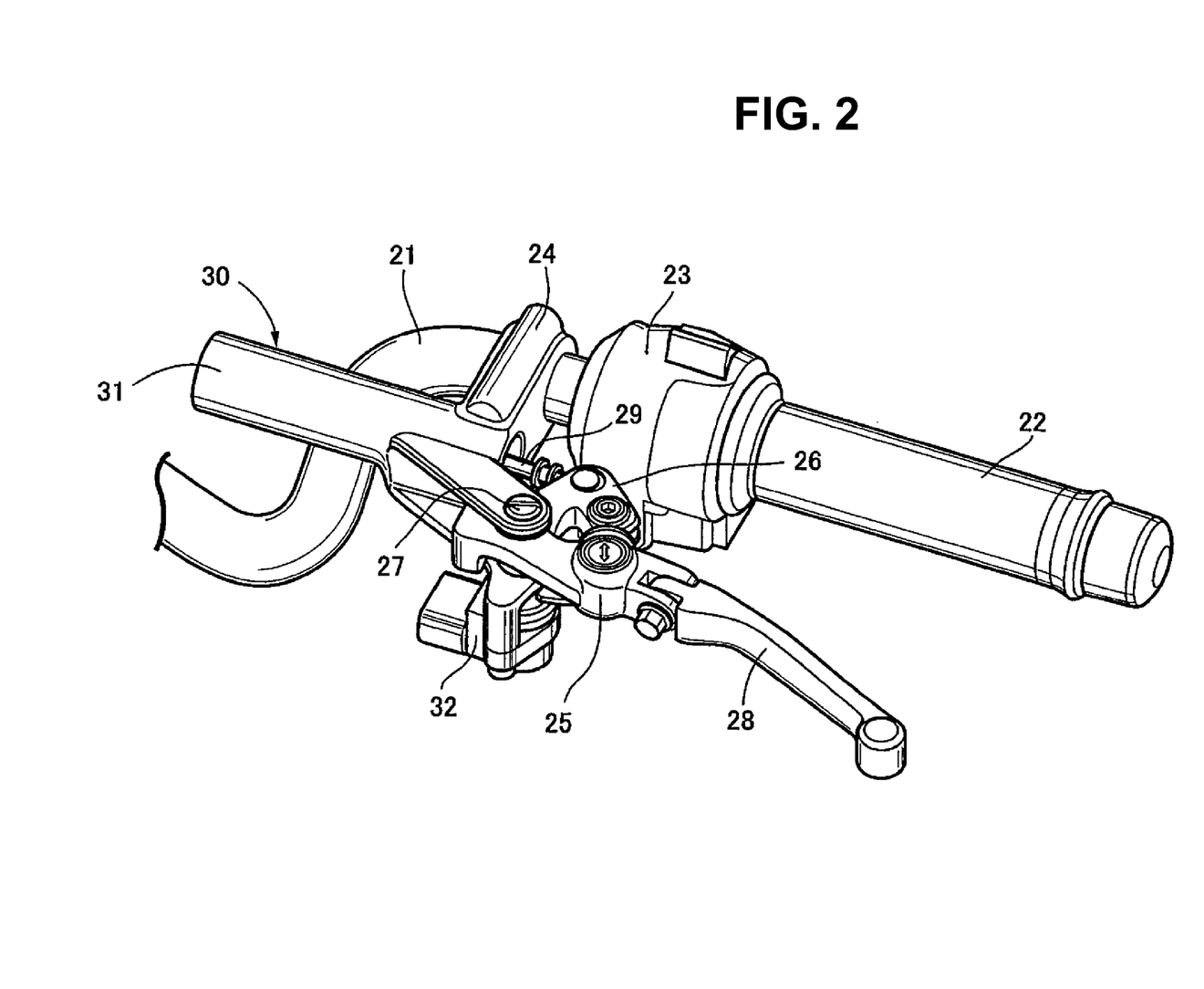
FIG. 2 is a perspective view of a clutch lever, a feedback unit, and their associated components.

Referring to FIG. 2, a left end portion of a bar handle 21 in the motorcycle is provided with a grip 22. The grip 22 is adapted to be gripped by the left hand of an operator. The bar handle 21 is further provided with a switch case 23 at a position adjacent to the laterally inner end of the grip 22. A lever holder 24 is fixed to the bar handle 21 at a position laterally inside of the switch case 23.

In other words, the switch case 23 is arranged between the grip 22 and the lever holder 24. A lever base 25, and a knocker 26 connected to the lever base 25 are pivotably supported, through a lever support bolt 27, on the lever holder 24. A clutch lever 28 is connected to the lever base 25 so as to be pivotably operated by the operator's left hand gripping the grip 22.

The lever holder 24 is integrally formed with a fixed cylindrical body 31 of a feedback unit 30 for applying an operation reaction force to the clutch lever 28. A push rod 29 projects from the cylindrical body 31. A projecting end of the push rod 29 is connected to the knocker 26. Accordingly, when the clutch lever 28 is pivotally operated, the clutch lever 28 and the lever base 25 are rotated together about the lever support bolt 27 thereby rotating the knocker 26 about the lever support bolt 27, so that the push rod 29 is axially driven by the knocker 26.

At this time, an operation load applied to the clutch lever 28 acts on the push rod 29 with the magnification corresponding to the ratio (leverage) between the distance from the center of the lever support bolt 27 to the point of application of the operation load to the clutch lever 28, and the distance from the center of the lever support bolt 27 to the point of connection of the knocker 26 to the push rod 29.

An operation amount sensor 32 (also referred as a lever angle sensor) for sensing the operation amount of the clutch lever 28 is mounted on the lever holder 24 in such a manner as to detect the rotary position of the clutch lever 28 and the lever base 25. The operation amount sensor 32 is a lever angle sensor 32.

Referring again to FIG. 1, the operation amount or rotary position of the clutch lever 28 detected by the lever angle sensor 32 is input into an electronic control unit 18. The electronic control unit 18 controls the operation of the electric motor 17 according to the detected operation amount of the clutch lever 28 received from the lever angle sensor 32.

Further, a sensor 33 is provided to detect the operation amount of the electric motor 17, and the detection value output from the sensor 33 is input into the electronic control unit 18. Further, the electromagnetic on-off valve 16 interposed between the master cylinder 15 and the slave cylinder 12. The operation of the electromagnetic on-off valve 16 is controlled by the electronic control unit 18.

Figure 3:
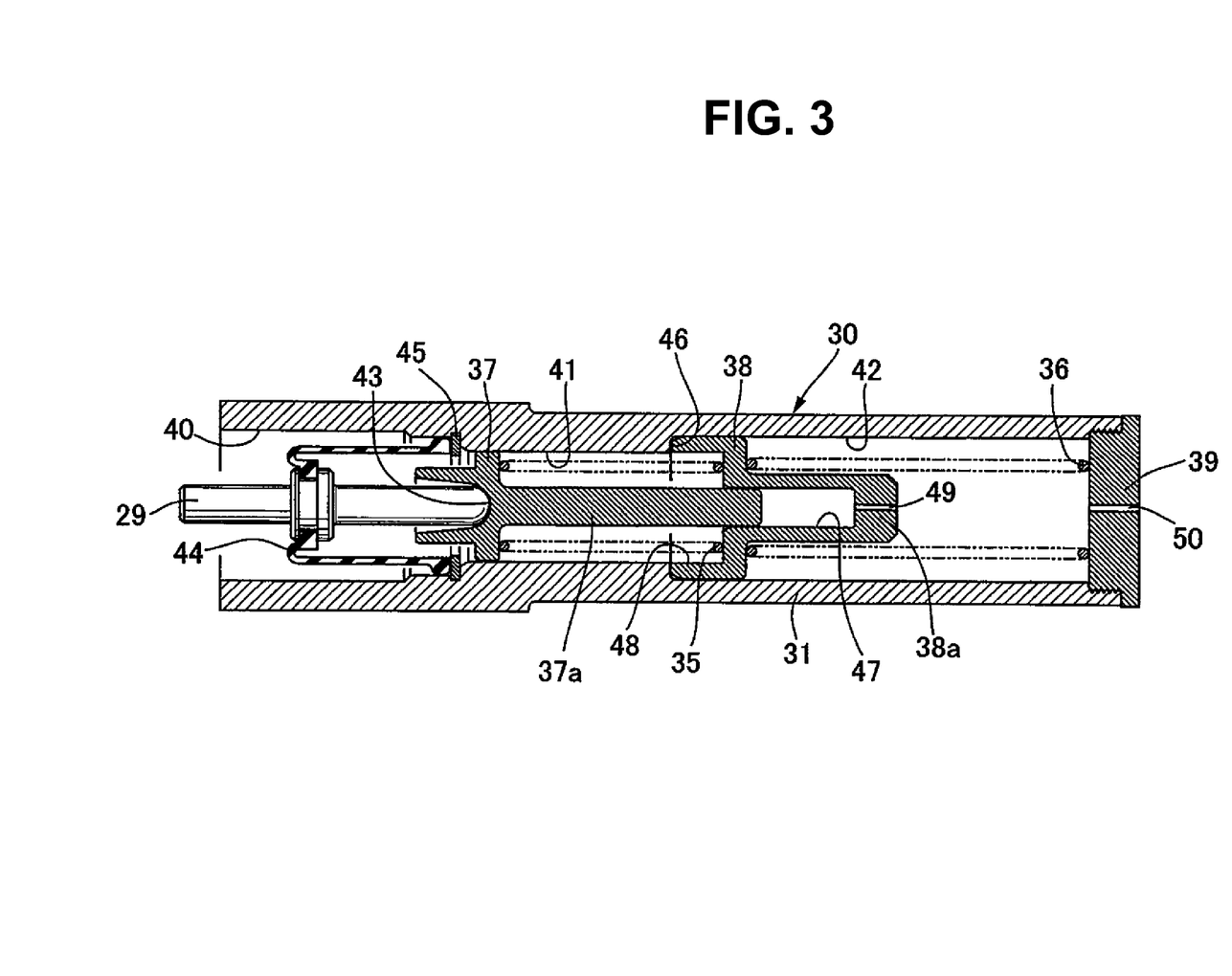
FIG. 3 is a longitudinal sectional view of the feedback unit.

Referring to FIG. 3, the feedback unit includes has a first spring 35 and a second spring 36. Each of the first spring 35 and the second spring 36 has a different spring constant. During operation of the clutch lever 28 in a direction such that the rotary position of the clutch lever 28 is increased, the elastic forces of the first and second springs 35 and 36 are sequentially applied to the clutch lever 28 as an operation reaction force.

In the illustrative embodiment, the first spring 35 and the second spring 36 are arranged in series and are accommodated in the cylindrical body 31 formed integrally with the lever holder 24. A spring constant of the second spring 36 is less than a spring constant of the first spring 35. A set load on the second spring 36 is greater than a set load on the first spring 35.

The feedback unit 30 is configured so that when the operation amount of the clutch lever 28 is less than or equal to a predetermined value, the elastic force of the first spring 35 is applied to the clutch lever 28 as a reaction force; whereas when the operation amount of the clutch lever 28 is greater than the predetermined value, the elastic forces of the first and second springs 35 and 36 are applied to the clutch lever 28 as a reaction force.

The cylindrical body 31 has a cylindrical shape such that one end thereof is open and the other end thereof is closed by a lid member 39. The cylindrical body 31 is formed with a first hole 40, a second hole 41 smaller in diameter than the first hole 40, and a third hole 42 larger in diameter than the second hole 41. The first, second, and third holes 40, 41, and 42 extend coaxially and continuously in this order from the open end to the closed end of the cylindrical body 31. The push rod 29 is inserted in the first hole 40.

A first piston 37 is slidably fitted in the second hole 41. The first piston 37 has a spherical recess 43 for oscillatably receiving the spherical inner end of the push rod 29. A second piston 38 is slidably fitted in the third hole 42. The first spring 35 is a compression coil spring. The first spring 35 is arranged between the first piston 37 and the second piston 38. The second spring 36 as a compression coil spring. The second spring 36 is arranged between the second piston 38 and the lid member 39.

A boot 44 is mounted at its one end to an intermediate portion of the push rod 29, and the other end of the boot 44 is in elastic abutment against the inner circumference of the first hole 40 at an inner end portion thereof. A stop ring 45 for avoiding the escape of the first piston 37 from the second hole 41 is mounted on the inner circumference of the first hole 40 at an inner end portion thereof. An annular shoulder portion 46 is formed between the second hole 41 and the third hole 42 in the cylindrical body 31. The second piston 38 is adapted to abut against the annular shoulder portion 46.

Figure 4:
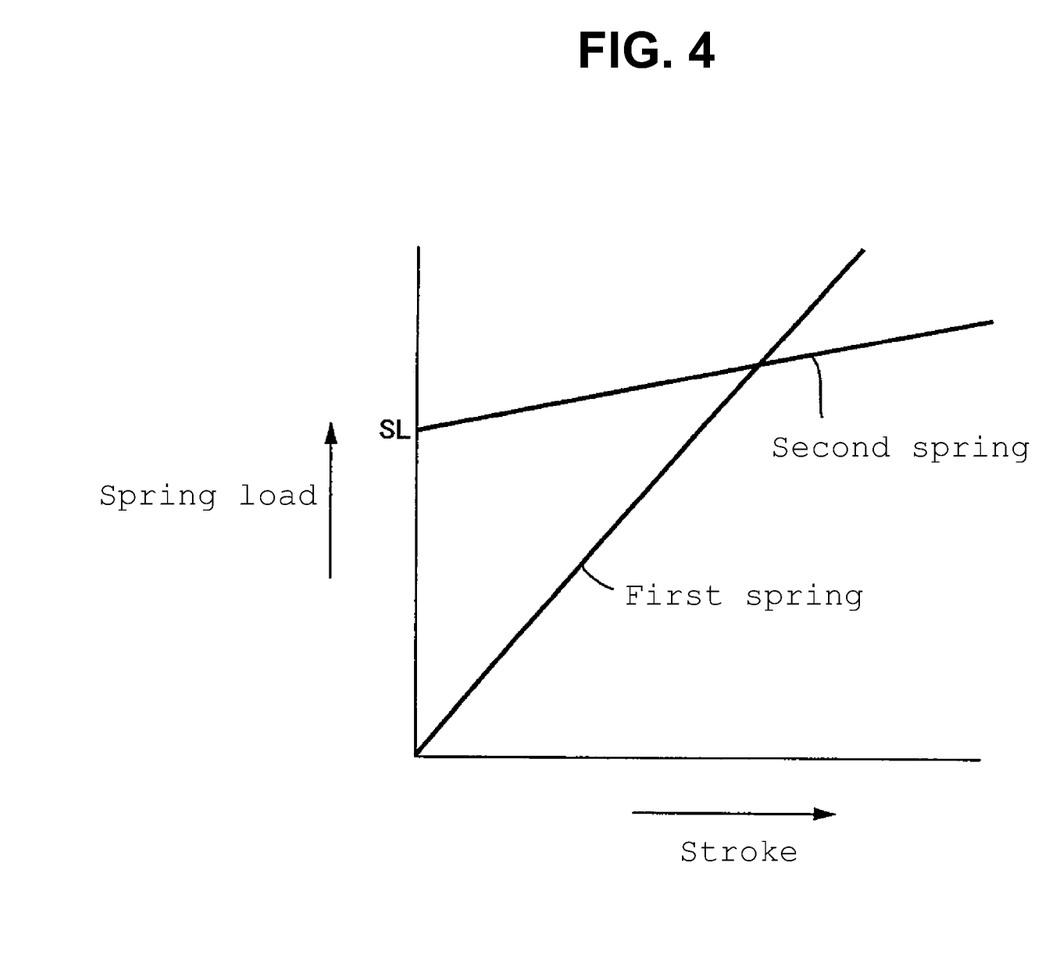
FIG. 4 is a graph showing the load characteristics of first and second springs of the feedback unit.

The first spring 35 has a spring constant as shown in FIG. 4. That is, the first spring 35 has a relatively large spring constant such that a spring load largely changes with a small stroke. The first spring 35 has a free length smaller than or slightly larger than the distance between the first piston 37 abutting against the stop ring 45 and the second piston 38 abutting against the annular shoulder portion 46. That is, the set load on the first spring 35 is "0" (zero) or a very small value as shown in FIG. 4.

On the other hand, the second spring 36 has a spring constant as shown in FIG. 4. That is, the second spring 36 has a spring constant smaller than that of the first spring 35 such that a spring load changes a little with a small stroke. The second spring 36 has a free length larger than the distance between the second piston 38 abutting against the annular shoulder portion 46 and the lid member 39. That is, the set load on the second spring 36 has a large value SL as shown in FIG. 4.

The first piston 37 is coaxially and integrally formed with a shaft portion 37a. The second piston 38 is coaxially and integrally formed with a cylindrical portion 38a having a guide hole 47 for slidably receiving and engaging the shaft portion 37a. The cylindrical portion 38a of the second piston 38 is inserted in one end portion of the second spring 36. The second piston 38 is further formed with a holding recess 48 having a circular cross section for receiving one end portion of the first spring 35 such that the other end of the first spring 35 abuts against the first piston 37.

The closed end of the cylindrical portion 38a of the second piston 38 is formed with an air vent hole 49 for smoothing the sliding operation of the first piston 37. Further, the lid member 39 closing the other end of the cylindrical body 31 is also preferably formed with an air vent hole 50 for smoothing the sliding operation of the first and second pistons 37 and 38.

Alternatively, either the outer circumference of the second piston 38 or the inner circumference of the third hole 42 may be formed with a groove as an air vent passage in place of the air vent hole 50. Accordingly, it is possible to prevent the entry of water, etc. through the air vent hole 50 into the third hole 42.

When the push rod 29 is depressed by the operation of the clutch lever 28, the first piston 37 is pushed by the push rod 29 to move in the second hole 41 by deforming the first spring 35. In this first stage, however, the second spring 36 has not yet been deformed because the set load thereof has the large value SL, so that the second piston 38 remains abutting against the annular shoulder portion 46. In the first stage, the lever operation load is rapidly increased as shown by a solid line in FIG. 5.

Figure 5:
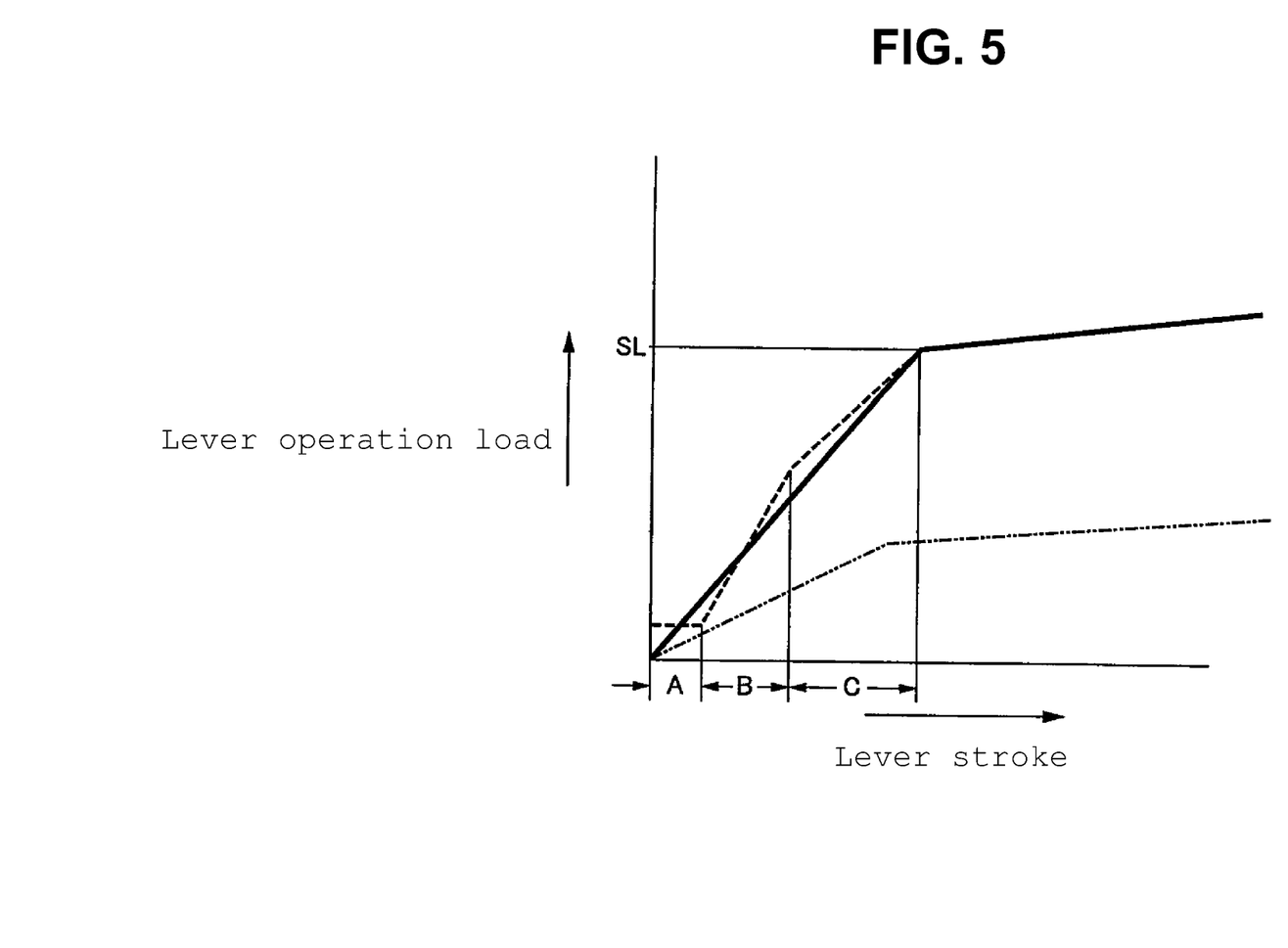
FIG. 5 is a graph showing the operation load characteristics of the clutch lever.

When the lever operation load reaches the set load SL of the second spring 36, the second piston 38 starts moving in the third hole 42 by deforming the second spring 36. In this second stage, the elastic forces of the first and second springs 35 and 36 are applied as a reaction force to the clutch lever 28. The spring constant of the second spring 36 is less than the spring constant of the first spring 35. Accordingly, the second spring 36 is largely deformed according to a change in applied load, so that the load change in the second stage becomes smaller than that in the first stage as shown in FIG. 5.

The operation of the illustrative embodiment will now be described.

The electric motor (actuator) 17 for driving the clutch assembly 11 is controlled by the electronic control unit 18 according to the detected operation amount of the clutch lever 28 received from the lever angle sensor 32. A reaction force is applied to the clutch lever 28 by the feedback unit 30 having the first and second springs 35 and 36 of different spring constants.

In other words, when the clutch lever 28 is operated in an operation amount increasing direction thereof, the elastic forces of the first and second springs 35 and 36 are sequentially applied to the clutch lever 28 as a reaction force. Thus, the characteristics of a reaction force acting on the clutch lever 28 are provided by the combination of the reaction characteristics by the first and second springs 35 and 36.

Accordingly, it is possible to provide an operator of the vehicle with an operation feel similar to that obtained by the conventional operation force applied to the clutch lever 28 transmitted to the clutch assembly 11 by oil pressure or wire.

In the conventional apparatus, an operation force applied to the clutch lever 28 is hydraulically transmitted to the clutch assembly 11. In the conventional apparatus, the lever operation load changes as shown by a broken line in FIG. 5. That is, in an initial stroke range A, the lever operation load is almost constant because of the play between the clutch lever 28 and a push rod of a clutch master cylinder.

In the next stroke range B, the lever operation load is relatively rapidly increased so as to absorb the play such as the deformation of a hydraulic hose. In the next stroke range C, the lever operation load is increased less rapidly than that in the stroke range B according to a spring reaction force in the clutch assembly 11. Thereafter, when the lever operation load reaches the value SL, the clutch assembly 11 is operated to engage or disengage the transmission of power.

As shown in FIG. 5, the operation load characteristics of the clutch lever 28 according to the present invention can be made similar to those of the prior art, so that an operation feel similar to that is achieved in conventional apparatus can be provided to the operator, during operation of the vehicle.

The feedback unit 30 includes the first and second springs 35, 36 connected in series. The spring constant of the second spring 36 is less than the spring constant the first spring 35, and the set load on the second spring 36 is greater than the set load on the first spring 35. When the operation amount of the clutch lever 28 is less than or equal to a predetermined value, the elastic force of the first spring 35 is applied to the clutch lever 28, and when the operation amount of the clutch lever 28 is greater than the predetermined value, the combined elastic forces of both the first and second springs 35 and 36 are applied to the clutch lever 28.

Accordingly, it is possible to realize a change in the relation between the operation amount of the clutch lever 28 and the operation load on the clutch lever 28 between in the first stage before engaging or disengaging the clutch assembly 11 and in the second stage occurring after the first stage.

Each of the first and second springs 35 and 36 includes a compression coil spring having stable reaction characteristics based on a spring constant and a free length thereof. Accordingly, variations in the mass production of the first and second springs 35 and 36 can be suppressed.

Further, the spring loads and set loads on the first and second springs 35 and 36 may be freely set. For example, by setting the spring loads and set loads on the first and second springs 35 and 36 to lower values, the operation load on the clutch lever 28 can be greatly reduced as compared with the conventional system as shown by a dot and dash line in FIG. 5. Also in this case, the operational load characteristics can be made similar to those in the prior art, so that a similar operation feel can be ensured.

The first piston 37 operatively connected to the clutch lever 28 is slidably fitted in the fixed cylindrical body 31, and the second piston 38 is slidably fitted in the cylindrical body 31 such that the first spring 35 is interposed between the first piston 37 and the second piston 38. Further, the second spring 36 is interposed between the second piston 38 and the cylindrical body 31.

Accordingly, the feedback unit 30 can be configured by using a portion of the master cylinder used in the conventional devices such that an operation force applied to the clutch lever 28 is hydraulically transmitted to the clutch assembly 11. As a result, a cost reduction can be expected as compared with the case that specific, dedicated components are required.

Further, some components of the conventional clutch system such that an operation force applied to the clutch lever 28 is hydraulically transmitted to the clutch assembly 11 may be used for the lever holder 24, the lever base 25, the knocker 26, and the push rod 29. Accordingly, a cost reduction can be expected.

The first piston 37 is coaxially and integrally formed with the shaft portion 37a, and the second piston 38 is coaxially and integrally formed with the cylindrical portion 38a having the guide hole 47 for slidably engaging the shaft portion 37a. Further, the cylindrical portion 38a is inserted in one end portion of the second spring 36 as a compression coil spring.

Accordingly, smoothing of the sliding operation of the first piston 37 in the cylindrical body 31 and positioning of one end portion of the second spring 36 can be realized with a simple structure using no dedicated parts.

The second piston 38 is further formed with the holding recess 48 for receiving one end portion of the first spring 35 such that the other end of the first spring 35 as a compression coil spring abuts against the first piston 37. Accordingly, positioning of one end portion of the first spring 35 can be realized with a simple structure using no dedicated parts.

It should be noted that the present invention is not limited to the above preferred embodiment, but various modifications may be made without departing from the scope of the present invention as defined in the appended claims.

For example, while the feedback unit 30 includes the first and second springs 35 and 36 in the above illustrative embodiment, the feedback unit in the present invention may include three or more springs having different spring constants. In this case, it is possible to obtain operation load characteristics further approximated to those of a conventional apparatus shown by the broken line in FIG. 5.

Further, the compression coil spring used for each of the first and second springs 35 and 36 in the illustrative embodiment may be replaced by a torsion spring. In this case, a torsion spring is inferior to a compression coil spring from the viewpoint of stability of spring characteristics. However, space saving can be expected by the use of a torsion spring.

Further, a single coil spring composed of a plurality of parts having different spring constants may be used instead of the plural coil springs 35 and 36. Also in this case, similar characteristics can be obtained.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An electronic clutch control apparatus for a vehicle having a clutch assembly and a clutch lever operatively associated with said clutch assembly, said electronic clutch control apparatus comprising:
    an operation amount sensor for sensing an operation amount of the clutch lever;
    an actuator for driving the clutch assembly;
    an electronic control unit for controlling the operation of said actuator according to a detected operation amount received from said operation amount sensor; and
    a feedback unit for applying an operation reaction force to said clutch lever; said feedback unit comprising a plurality of springs, each of said springs having a different spring constant;
    wherein the feedback unit is configured and arranged such that when an increasing operation force is applied to said clutch lever, elastic forces of said springs are sequentially applied to said clutch lever as said operation reaction force;
    wherein said plurality of springs of said feedback unit comprises a first spring having a first spring constant and a second spring having a second spring constant and connected in series with said first spring, and wherein said second spring constant is less than said first spring constant, and a set load on said second spring is greater than a set load on said first spring.

2. An electronic clutch control apparatus according to claim 1, wherein the feedback unit is configured and arranged such that when the operation amount of said clutch lever is less than or equal to a predetermined value, the elastic force of said first spring is applied to said clutch lever, and wherein when the operation amount of said clutch lever is greater than said predetermined value, the elastic forces of said first and second springs are both applied to said clutch lever.

3. An electronic clutch control apparatus according to claim 2, wherein said feedback unit further comprises:
    a fixed cylindrical body;
    a first piston slidably fitted in said cylindrical body and operatively connected to said clutch lever, and
    a second piston slidably fitted in said fixed cylindrical body such that said first spring is interposed between said first piston and said second piston, and said second spring is interposed between said second piston and said fixed cylindrical body.

4. An electronic clutch control apparatus according to claim 3, wherein:
    said first piston is coaxially and integrally formed with a shaft portion,
    said second piston is coaxially and integrally formed with a cylindrical portion having a guide hole formed therein for slidably engaging said shaft portion of the first piston;
    said second spring comprises a compression coil spring, and
    said cylindrical portion is inserted in one end portion of said second spring.

5. An electronic clutch control apparatus according to claim 3, wherein:
    said first spring comprises a compression coil spring; and
    said second piston is formed with a holding recess therein for receiving one end portion of said first spring such that the other end of said first spring abuts against said first piston.

6. An electronic clutch control apparatus according to claim 4, wherein:
    said first spring comprises a compression coil spring; and
    said second piston is formed with a holding recess for receiving one end portion of said first spring such that the other end of said first spring abuts against said first piston.

7. An electronic clutch control apparatus according to claim 1, wherein said actuator is an electric motor.

8. An electronic clutch control apparatus according to claim 1, wherein said operation amount sensor is a lever angle sensor.

9. An electronic clutch control apparatus for a vehicle including a clutch assembly and a clutch lever operatively associated with said clutch assembly, said electronic clutch control apparatus comprising:
    an electric motor for driving the clutch assembly;
    a lever angle sensor for sensing a rotary position of the clutch lever;
    an electronic control unit for controlling the operation of said electric motor according to detected rotary position of said clutch lever received from said lever angle sensor; and
    a feedback unit for applying an operation reaction force to said clutch lever; said feedback unit comprising a pair of springs;
    wherein the springs of the feedback unit are operable to sequentially apply said operation reaction force to said clutch lever when said clutch lever is operated in a direction such that the rotary position thereof is increased;
    wherein said pair of springs of said feedback unit comprises a first spring having a first spring constant and a second spring having a second spring constant and connected in series with said first spring,
    and wherein said second spring constant is less than said first spring constant, and a set load on said second spring is greater than a set load on said first spring.

10. An electronic clutch control apparatus according to claim 9,
    wherein when the rotary position of said clutch lever is less than or equal to a predetermined value, the elastic force of said first spring is applied to said clutch lever, and
    wherein when the rotary position of said clutch lever is greater than said predetermined value, the elastic forces of said first and second springs are applied to said clutch lever.

11. An electronic clutch control apparatus according to claim 10, wherein said feedback unit further comprises
    a cylindrical body;
    a first piston operatively connected to said clutch lever, and slidably fitted in said cylindrical body, and a second piston slidably fitted in said cylindrical body such that said first spring is interposed between said first piston and said second piston, and said second spring is interposed between said second piston and said cylindrical body.

12. An electronic clutch control apparatus according to claim 11, wherein:
said first piston is coaxially and integrally formed with a shaft portion,
said second piston is coaxially and integrally formed with a cylindrical portion having a guide hole for slidably receiving said shaft portion of the first piston;
said second spring comprises a compression coil spring; and
said cylindrical portion is inserted in one end portion of said second spring.

13. An electronic clutch control apparatus according to claim 11, wherein:
said first spring comprises a compression coil spring; and
said second piston is formed with a holding recess for receiving one end portion of said first spring such that the other end of said first spring abuts against said first piston.

14. An electronic clutch control apparatus according to claim 12, wherein:
said first spring comprises a compression coil spring; and
said second piston is formed with a holding recess for receiving one end portion of said first spring such that the other end of said first spring abuts against said first piston.

15. An electronic clutch control apparatus for a vehicle, said vehicle having an engine, a transmission unit, a clutch assembly arranged between the engine and the transmission unit, and a clutch lever operatively associated with the clutch assembly;
said electronic clutch control apparatus comprising:
an electric motor for driving the clutch assembly;
a lever angle sensor for sensing a rotary position of the clutch lever;
an electronic control unit for controlling operation of said electric motor based on detected rotary position received from said lever angle sensor; and
a feedback unit for applying a reaction force to said clutch lever;
wherein said feedback unit comprises a first spring having a first spring constant and a second spring having a second spring constant and connected in series with said first spring, wherein said second spring constant is less than said first spring constant, and a set load on said second spring is greater than a set load on said first spring;
and wherein said feedback unit is operable to sequentially apply said reaction force to said clutch lever when said clutch lever is operated in a direction such that the rotary position thereof is increased.

16. An electronic clutch control apparatus according to claim 15,
wherein when the rotary position of said clutch lever is less than or equal to a predetermined value, the elastic force of said first spring is applied to said clutch lever; and
wherein when the rotary position of said clutch lever is greater than said predetermined value, the elastic forces of said first and second springs are applied to said clutch lever.

17. An electronic clutch control apparatus according to claim 16, wherein said feedback unit further comprises
a cylindrical body;
a first piston operatively connected to said clutch lever, and slidably fitted in said cylindrical body, and
a second piston slidably fitted in said cylindrical body such that said first spring is interposed between said first piston and said second piston, and said second spring is interposed between said second piston and said cylindrical body.

18. An electronic clutch control apparatus according to claim 17, wherein:
said first piston is coaxially and integrally formed with a shaft portion,
said second piston is coaxially and integrally formed with a cylindrical portion having a guide hole for slidably receiving said shaft portion of the first piston;
said second spring comprises a compression coil spring, and
said cylindrical portion is inserted in one end portion of said second spring.

19. An electronic clutch control apparatus according to claim 17, wherein:
said first spring comprises a compression coil spring; and
said second piston is formed with a holding recess for receiving one end portion of said first spring such that the other end of said first spring abuts against said first piston.

20. An electronic clutch control apparatus according to claim 18, wherein:
said first spring comprises a compression coil spring; and
said second piston is formed with a holding recess for receiving one end portion of said first spring such that the other end of said first spring abuts against said first piston.

* * * * *